United States Patent [19]

Ohm

[11] 4,104,235
[45] Aug. 1, 1978

[54] SOLDERABLE WIRE LACQUERS

[75] Inventor: Klaus Ohm, Nettetal-Lobberich, Fed. Rep. of Germany

[73] Assignee: Chemische Fabrik Dr. Wiedeking, Kempen, Fed. Rep. of Germany

[21] Appl. No.: 731,925

[22] Filed: Oct. 13, 1976

[30] Foreign Application Priority Data

Oct. 14, 1975 [DE] Fed. Rep. of Germany ....... 2545912

[51] Int. Cl.$^2$ .............................................. C08K 5/06
[52] U.S. Cl. ......................... 260/33.2 R; 260/31.4 R; 260/32.8 N
[58] Field of Search ..................... 260/31.4 R, 32.8 N, 260/33.2 R, 77.5 TB

[56] References Cited

U.S. PATENT DOCUMENTS

| | | | |
|---|---|---|---|
| 3,248,371 | 4/1966 | Damusis | 260/31.4 R |
| 3,640,938 | 2/1972 | Finelli | 260/32.8 N |
| 3,748,315 | 7/1973 | Wooster | 260/32.8 N |
| 3,808,160 | 4/1974 | Steinmetz | 260/77.5 TB |
| 3,819,586 | 6/1974 | Rudolph | 260/77.5 TB |

*Primary Examiner*—Paul R. Michl
*Attorney, Agent, or Firm*—Hans Berman

[57] ABSTRACT

Lacquers of low viscosity at high solids content suitable for forming baked coatings on conductive wires which do not interfere with tinning and soldering of the coated wires consist essentially of a polyester of isophthalic or terephthalic acid having a hydroxyl number of 150 to 450, an isocyanate having isocyanato groups masked with ε-caprolactam, and of a solvent consisting essentially of at least one member of the group consisting of diacetone alcohol, lower alkyl ethers of ethylene glycol or diethylene glycols, and esters of said ethers with lower alkanoic acids, said lower alkyl having up to three carbon atoms, and said lower alkanoic acids having up to four carbon atoms.

1 Claim, No Drawings

SOLDERABLE WIRE LACQUERS

The invention relates to a wire lacquer permitting direct soldering of the wire with tin, consisting of a mixture of polyesters having available OH-groups and stabilized isocyanates dissolved in an organic solvent. Because of their excellent thermal stability, particularly polyesters based on terephthalic or isophahalic acid were combined heretofore with cresol as a solvent and phenols as stabilizers. These known wire lacquers have outstanding processing characteristics and good storage stability.

The operativeness for timing the known wire lacquers described above as to their essential components is based on the fact that the isocyanato groups of one component of the polyurethane formed during baking is stabilized by masking agents split off only during baking, whereby the isocyanato groups are set free for reaction with the polyesters having OH groups.

Phenols are used practically exclusively as masking or stabilizing agents because they provide good protection of the isocyanato groups, but also are split off with sufficient ease during baking. This behavior is of great importance because the operating rate of a suitable wire lacquering installation depends on it, and the installation must be run a slower rate with masking agents which are too firmly attached. For this reason, other stabilizing or masking agents, such as primary alcohols, acids, and esters, known in themselves in large numbers, have not found practical applications.

It is a substantial disadvantage of the phenols employed as masking agents that they are liberated in substantial amounts during the manufacture of lacquered wires and burden the environment by their intensive odor and their detrimental effects on health.

For this reason, there is an urgent, practical need for a solderable wire lacquer which satisfies the steadily increasing requirements particularly of exhaust gas laws and which is still processed with equal ease as the known wire enamels permitting good tinning.

Therefore, it is the object of the invention to provide a wire lacquer for direct soldering which does not have the above disadvantages, which in particular does not constitute a burden on the environment and is still capable of being processed well and at high operating rates, that is, is still of low viscosity even at high solids content.

The above object is achieved according to the invention by a wire lacquer permitting direct soldering of a lacquered wire with tin consisting of a mixture of polyesters having available OH groups and isocyanates whose isocyanato groups are stabilized, dissolved in an organic solvent which lacquer is characterized by the combination of the following features:
a. an OH-group bearing polyester of iso- and/or terephthalic acid having an OH number of 150 to 450,
b. an isocyanate stabilized with caprolactam, and
c. a solvent of the group of ethers and/or esters of glycols and/or diacetone alcohol.

Particularly suitable are the ethers and/or esters of ethyleneglycol and/or diethyleneglycol.

The following advantages are achieved by the combination of these features which individually may have been proposed perhaps before in such solderable wire lacquers:

1. There is obtained a tinnable wire lacquer which is distinctly friendly to the environment and is neither of obnoxious odor nor detrimental to health because of the solvent of the wire lacquer or the masking agent.

2. The wire lacquer solids have a better solubility in the solvent of the invention than in the phenolic solvents so that a solids content up to 40% by weight and more is possible.

3. The viscosity is still comparable with that of conventional wire lacquers of lower solids content, and this results in excellent processing characteristics and high working rates.

4. The wire lacquers show outstanding storage ability.

The iso- and/or terephthalic acid esters preferably have an OH number between 150 and 450. This is achieved in a known manner by operating with an excess of esterifying alcohols.

The particular superiority of lactams, especially of the $\epsilon$-caprolactam preferentially suitable as a stabilizing agent in combination with the two other features of the inventive combination, is due first to the fact that no substances obnoxious to the sense of smell and detrimental to health are split off during baking, further to the fact that the isocyanato groups are safely protected, and the wire lacquer is stable in storage for this reason while the stabilizing agent is still split off easily and quickly during baking.

The following ethers and esters have proven particularly useful as solvents for the polyester and isocyanate components: From the group of ethylene glycols:
The methyl, ethyl, and propyl ethers of ethylene glycol as well as their formates, acetates, propionates, and butyrates, such as ethoxyethyl acetate and methoxyethyl acetate; from the group of diethylene glycols: The monomethyl and monoethyl esters of diglycol the dimethol ether of diglycol and diethylene glycol monoethyl ether acetate. Diethylene glycol monoethyl ether is particularly well suited because it has a particularly high evaporation number. These solvents may also be employed in mixtures with each other and, within certain limits, also in admixture with additional solvents, for example, aromatic hydrocarbons such as xylene, which of course also must not be inimical to the environment and must not substantially impair the outstanding solvating and processing characteristics of the glycol ethers.

The invention is being illustrated below by a typical example without limiting the invention to this example.

EXAMPLE (A)

Preparation of the stabilized isocyanate: 979 parts of a reaction product from 3 mols toluylenediisocyanate and 1 mole trimethylolpropane are disolved in diethylene glycol ethyl ether acetate to form a 67% solution, and are heated with 350 parts $\epsilon$-caprolactam about two hours at about 120° C.

EXAMPLE (B)

Preparation of the polyester based on isophthalic acid:
780 parts glycerol
630 parts ethylene glycol
1 part manganese acetate
270 parts dimethyl terephthalate
1951 part isophthalic acid
are condensed at temperatures up to 230° C. The OH number of the resulting polyester is approximately 300.

EXAMPLE (C)

Preparation of the Wire Lacquer
200 parts A
90 parts B
200 parts diethylene glycol methyl ether
110 parts xylene
yield an approximately 40% lacquer having a viscosity of about 35 seconds DIN.

I claim:

1. In a wire lacquer permitting tinning and soldering of a wire coated therewith, the lacquer consisting essentially of a polyester of isophthalic or terephthalic acid having a hydroxyl number of 150 to 450, an isocyanate having masked isocyanato groups, and a solvent dissolving said polyester and said isocyanate, the improvement which includes:

(a) said isocyanate being masked by ε-caprolactam; and
(b) said solvent consisting essentially of at least one member of the group consisting of diglycol monomethyl ether or diglycol monoethyl ether.